US009544457B2

(12) United States Patent
Wada et al.

(10) Patent No.: US 9,544,457 B2
(45) Date of Patent: Jan. 10, 2017

(54) IMAGE-READING APPARATUS, IMAGE-READING METHOD, PROGRAM, AND RECORDING MEDIUM

(71) Applicant: PFU Limited, Ishikawa (JP)

(72) Inventors: Tomoaki Wada, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/305,932

(22) Filed: Jun. 16, 2014

(65) Prior Publication Data

US 2015/0256696 A1 Sep. 10, 2015

(30) Foreign Application Priority Data

Mar. 5, 2014 (JP) ................... 2014-043204

(51) Int. Cl.
*H04N 1/00* (2006.01)
(52) U.S. Cl.
CPC ...... *H04N 1/00809* (2013.01); *H04N 1/00005* (2013.01); *H04N 1/0005* (2013.01); *H04N 1/00082* (2013.01); *H04N 1/00689* (2013.01); *H04N 1/00718* (2013.01); *H04N 1/00737* (2013.01); *H04N 1/00822* (2013.01)
(58) Field of Classification Search
CPC ................................. H04N 1/00809
See application file for complete search history.

(56) References Cited

U.S. PATENT DOCUMENTS

2006/0221411 A1* 10/2006 Aoki ................. H04N 1/00795
358/474

FOREIGN PATENT DOCUMENTS

JP     11-308437 A     11/1999
JP     2006-287360 A     10/2006

OTHER PUBLICATIONS

H11 308437 Mitsuhiro, "Inclined Image Corrector, Inclined Image Correction Method and Storage Medium" Nov. 5, 1999—previously supplied in prior Office Action.*
Notice of Rejection Japanese Patent Application No. 2014-043204 dated Sep. 9, 2014 with English translation.

* cited by examiner

*Primary Examiner* — Christopher D Wait
(74) *Attorney, Agent, or Firm* — McDermott Will & Emery LLP

(57) ABSTRACT

According to the present embodiment, an image-reading apparatus determines any one or both of the type of document and the shape of a document, selects any one or both of an appropriate document tilt detection method and an appropriate document position detection method according to any one or both of the determined type of document and the determined shape of a document, and detects any one or both of the tilt of the document and the position of the document by the selected detection method.

13 Claims, 11 Drawing Sheets

IMAGE-READING APPARATUS, IMAGE-READING METHOD, PROGRAM, AND RECORDING MEDIUM

CROSS-REFERENCE TO RELATED APPLICATION

This application is based upon and claims the benefit of priority from Japanese Patent Application No. 2014-043204, filed on Mar. 5, 2014, the entire contents of which are incorporated herein by reference.

BACKGROUND OF THE INVENTION

1. Field of the Invention

The present invention relates to an image-reading apparatus, an image-reading method, and a program.

2. Description of the Related Art

Heretofore, technologies of image-reading apparatus have been developed to automatically detect the tilt and position of a document and to clip only the document area.

For example, there is a method to improve the accuracy with which the document area is detected, where the linearity of the edge of a document is detected so that the effect of the edge that is different from the end of the document is reduced (see JP-A-2007-088654).

Furthermore, there is a method to improve the accuracy with which the tilt of a document is detected, where the two sides that are perpendicular to each other or the two sides that are parallel to each other are selected from the edge of a document, and the tilt of the document is detected (see JP-A-2009-267652).

However, conventional methods for detecting a document area have a problem in that it is difficult to handle various types of document and shapes of a document, such as a document of a medium that is stitched and cut out. Specifically, the cut side of a document is sometimes tilted compared with a group of other straight lines, or a distortion occurs on a document due to the manner of feeding it during reading; however, according to conventional methods for detecting the document area, it is difficult to detect the tilt and position of a document with a high accuracy.

SUMMARY OF THE INVENTION

It is an object of the present invention to at least partially solve the problems in the conventional technology.

According to an aspect of the present invention, an image-reading apparatus that reads an image includes a document determining unit that determines any one or both of a type of document and a shape of a document, a detection-method selecting unit that selects any one or both of an appropriate document tilt detection method and an appropriate document position detection method according to any one or both of the determined type of a document and the determined shape of the document, and a document detecting unit that detects any one or both of a tilt of a document and a position of a document by using the selected detection method.

According to another aspect of the present invention, an image-reading method executed by a computer includes a document determining step of determining any one or both of a type of document and a shape of a document, a detection-method selecting step of selecting any one or both of an appropriate document tilt detection method and an appropriate document position detection method according to any one or both of the determined type of document and the determined shape of the document, and a document detecting step of detecting any one or both of a tilt of a document and a position of a document by using the selected detection method.

According to still another aspect of the present invention, a non-transitory computer readable medium includes programmed instructions. The instructions, when executed by a computer, cause the computer to execute a document determining step of determining any one or both of a type of document and a shape of a document, a detection-method selecting step of selecting any one or both of an appropriate document tilt detection method and an appropriate document position detection method according to any one or both of the determined type of document and the determined shape of the document, and a document detecting step of detecting any one or both of a tilt of a document and a position of a document by using the selected detection method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an image-reading apparatus, an image-reading method, and a program according to the present invention is explained in detail below with reference to the drawings. The present invention is not limited to the embodiment. Particularly, in the explanation according to the present embodiment, a document scanner is sometimes exemplified as a document read unit; however, the present invention is not limited to this, and any document read units, such as an overhead scanner, handy scanner, multifunction product, or flatbed scanner, are applicable.

1. Configuration According to the Present Embodiment

Figure 1:
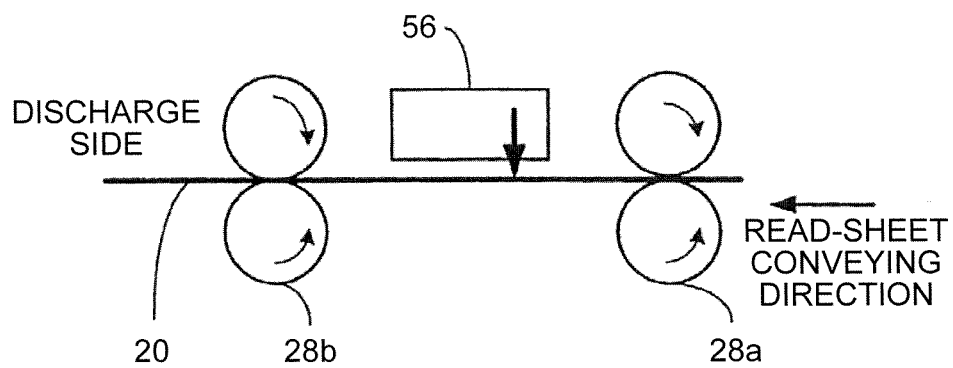
FIG. 1 is an explanatory diagram of a sheet feeding mechanism of a scanner that is used as a document read unit according to the present embodiment.

A configuration of an information processing apparatus 10 according to the present embodiment is explained with reference to FIGS. 1 to 4. FIG. 1 is an explanatory diagram of a sheet feeding mechanism of a scanner 50 that is used as a document read unit according to the present embodiment.

1-1. Physical Configuration

In FIG. 1, an image sensor 56 is provided on the top surface side of a document 20, and the scanner 50 used according to the present embodiment is configured to read an image on the top surface of the document 20. A configuration may be such that the same image sensor is provided on the back surface side of a document so that the two surfaces of the document can be read simultaneously. The scanner 50 feeds and discharges the document 20 by using conveyance rollers 28a, 28b so that it is conveyed in a read-sheet conveying direction.

Figure 2:
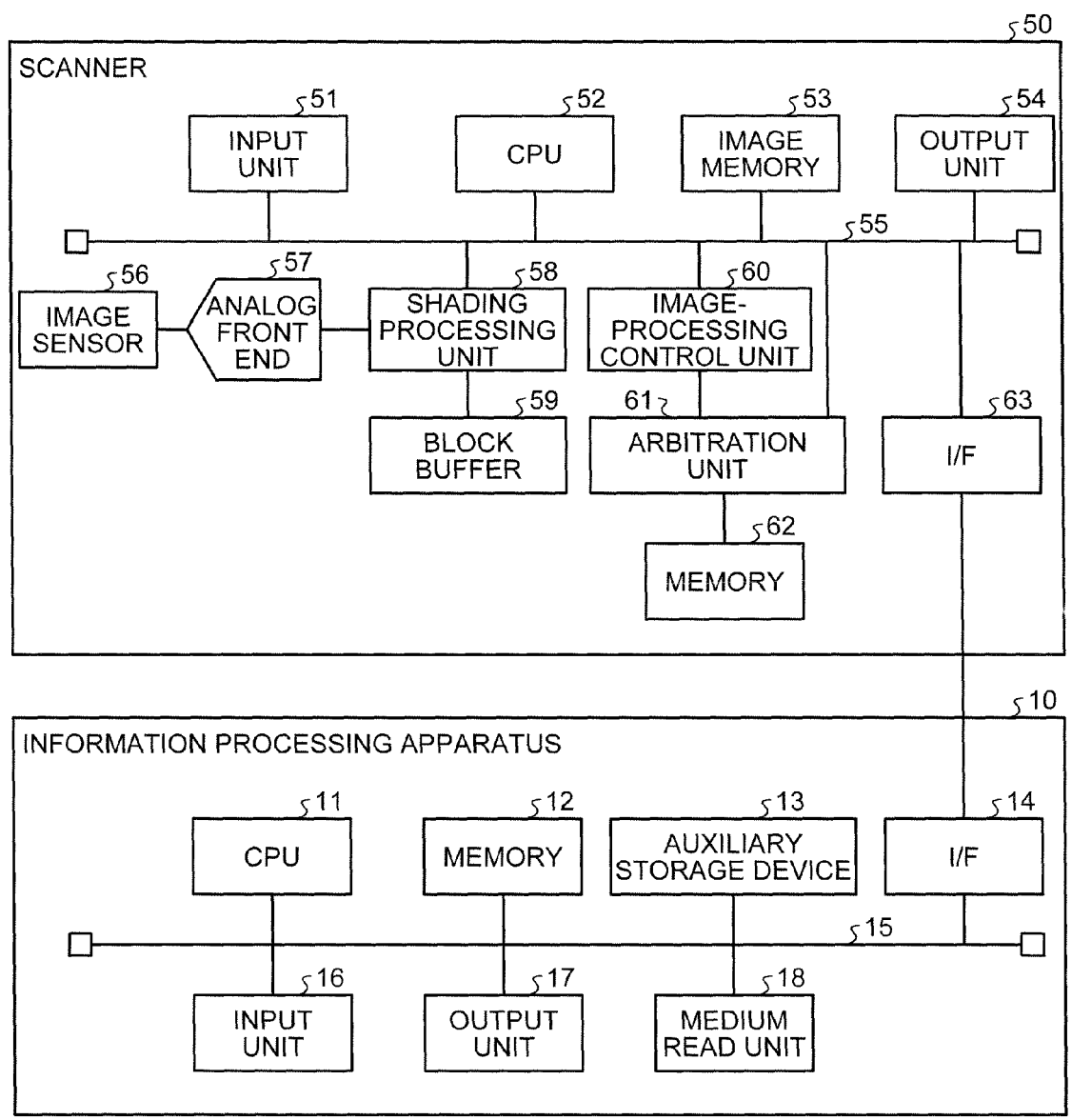
FIG. 2 is a hardware configuration diagram of an example of the scanner and an information processing apparatus according to the present embodiment.

More specifically, the conveyance rollers 28a and 28b convey the document 20 to the image sensor 56 and, when the image sensor 56 finishes reading one line, they move the document 20 for a small distance in a direction (the sub-scanning direction) perpendicular to the main scanning direction so that the image sensor 56 reads the next line. The conveyance roller 28b discharges, from the device, the document 20 for which image reading is finished. The scanner 50 may include an undepicted light source for irradiating a document with light. FIG. 2 is a hardware configuration diagram of an example of the scanner 50 and the information processing apparatus 10 according to the present embodiment.

As shown in FIG. 2, an image-reading system includes the scanner 50 and the information processing apparatus 10. The scanner 50 reads a two-dimensional document and generates an image signal that corresponds to the document. The information processing apparatus 10 is capable of communicating with the scanner 50 via a wired or wireless communication line, and it receives, via the communication line from the scanner 50, an image signal of the document that is read by the scanner 50.

The scanner 50 includes a Central Processing Unit (CPU) 52, a memory 62, the image sensor 56, an Analog Front-End Processor (AFE) 57, a shading processing unit 58, and a block buffer 59. The scanner 50 further includes an image-processing control unit 60, an image memory 53, an arbitration unit 61, an input unit 51, an output unit 54, an interface (I/F) 63, and a bus 55.

The CPU 52 controls an operation of the scanner 50 according to a computer program stored in the memory 62. According to an embodiment, the CPU 52 may perform image processing on the image of a document that is read by the scanner 50. The memory 62 may store a computer program for such image processing. The memory 62 stores a computer program that is executed by the CPU 52 and stores data that is used when the computer program is executed. The memory 62 may include a non-volatile storage device that stores programs or a volatile memory that temporarily stores data.

The image sensor 56 captures an image of a two-dimensional document and outputs the image signal that corresponds to the document. The image sensor 56 includes, for example, an imaging element, such as a Charge Coupled Device (CCD) sensor or a Complementary Metal Oxide Semiconductor (CMOS) sensor, which are arranged in one dimension or two dimensions, and includes an optical system that forms an image of a document on the imaging element. The AFE 57 performs signal processing, such as amplification, on the image signal that is output from the image sensor 56 and then inputs the processed image signal to the shading processing unit 58.

The shading processing unit 58 stores the image signal received from the AFE 57 as image data in the block buffer 59, performs shading processing on the image data, and then outputs it to the image-processing control unit 60. The image-processing control unit 60 performs predetermined image processing on the image data on which the shading processing has been performed and stores the image data in the image memory 53. According to another embodiment, the shading processing unit 58 may store, in the image memory 53, the image data on which the shading processing has been performed, and the image-processing control unit 60 may receive the image data from the image memory 53. To prevent the collision between the accesses to the memory 62 during image processing of the image-processing control unit 60 and the accesses to the memory 62 by the CPU 52, the arbitration unit 61 arbitrates the accesses.

According to an embodiment, the shading processing unit 58, the image-processing control unit 60, and the arbitration unit 61 may be installed as a logic circuit in the scanner 50. The logic circuit may be, for example, large scale integration (LSI), an Application Specific Integrated Circuit (ASIC), or a Field-Programming Gate Array (FPGA). According to another embodiment, the shading processing unit 58, the image-processing control unit 60, and the arbitration unit 61 may be installed in the scanner 50 as an electronic circuit that includes a processor, such as a CPU or a digital signal processor (DSP), and a memory that stores a program that is executed by the processor.

The input unit 51 is an input device that receives a user's input operation. The input unit 51 may be, for example, a button, scroll wheel, keypad, keyboard, pointing device, or touch panel. The output unit 54 is an output device that presents to a user various types of information from the scanner 50. For example, the output unit 54 may be a display device that visually displays to a user the information that is to be presented to the user. The output unit 54 may be a display device, such as a light emitting element, liquid crystal display, or organic electroluminescence display. The output unit 54 may be a speaker that outputs a sound signal and a drive circuit thereof.

The I/F 63 is a wired and/or wireless communication interface between the scanner 50 and the information processing apparatus 10. The scanner 50 is capable of transmitting the image data on the read document to the information processing apparatus 10 via the I/F 63. The scanner 50 receives setting information associated with an operation of the scanner 50 and commands from the information processing apparatus 10 via the I/F 63. According to an embodiment, the scanner 50 may receive, via the I/F 63, the image data processed by the information processing apparatus 10. The CPU 52, the shading processing unit 58, the image-processing control unit 60, the image memory 53, the arbitration unit 61, the input unit 51, the output unit 54, and the I/F 63 are electrically connected to one another via the bus 55.

The information processing apparatus 10 includes a CPU 11, an auxiliary storage device 13, a memory 12, an input unit 16, an output unit 17, a medium read unit 18, an I/F 14, and a bus 15. The CPU 11 executes a computer program stored in the auxiliary storage device 13 to perform information processing based on the computer program. According to an embodiment, the CPU 11 may perform image processing on an image of the document that is read by the scanner 50. The auxiliary storage device 13 may store a computer program for such image processing. The auxiliary storage device 13 may include a non-volatile storage device, a read only memory (ROM), a hard disk, or the like, to store a computer program.

The memory 12 stores the program that is currently executed by the CPU 11 and the data that is temporarily used by the program. The memory 12 may include a random access memory (RAM). The input unit 16 is an input device that receives a user's input operation. The input unit 16 may be, for example, a keypad, keyboard, pointing device, or touch panel.

The output unit 17 is an output device that outputs the signal processed by the information processing apparatus 10. For example, the output unit 17 may be a display device that visually displays to a user the information processed by the information processing apparatus 10. The output unit 17 may be a display device, such as a liquid crystal display, Cathode Ray Tube (CRT) display, or organic electroluminescence display. The output unit 17 may be a speaker that outputs a sound signal and a drive circuit thereof.

The medium read unit 18 is an input device that reads data stored in a portable recording medium readable by a computer. The medium read unit 18 may be, for example, a CD-ROM drive device, DVD-ROM drive device, flexible disk drive device, CD-R drive device, DVD-R drive device, MO drive device, or access device for a flash memory device.

The I/F 14 is a wired and/or wireless communication interface between the scanner 50 and the information processing apparatus 10. The information processing apparatus 10 is capable of receiving, via the I/F 14, the image data on the document read by the scanner 50. The information processing apparatus 10 transmits setting information associated with an operation of the scanner 50 and commands to the scanner 50 via the I/F 14. The CPU 11, the auxiliary storage device 13, the memory 12, the input unit 16, the output unit 17, the medium read unit 18, and the I/F 14 are electrically connected to one another via the bus 15.

The hardware configuration shown in FIG. 2 is only an example for explanation of the embodiment. An image processing system disclosed in this specification may use any other hardware configurations as long as it performs the operations described below.

1-2. Functional Configuration

An example of functional configurations of a storage unit 106 and a control unit 102 according to the present embodiment are explained with reference to FIGS. 3 and 4. In the above-described functional configuration, all or part of the functions of the storage unit 106 may be performed by the image memory 53, the memory 62, and/or the memory 12. In the above-described functional configuration, all or part of the functions of the control unit 102 may be performed by the CPU 52, the image-processing control unit 60, and/or the CPU 11. Any design change may be made to which physical configuration implements all or part of the functional configurations. In the following explanation according to the present embodiment, it is explained, as an embodiment, that the control unit 102 of the information processing apparatus 10 performs various types of processing based on the image data read by the scanner 50.

Figure 3:
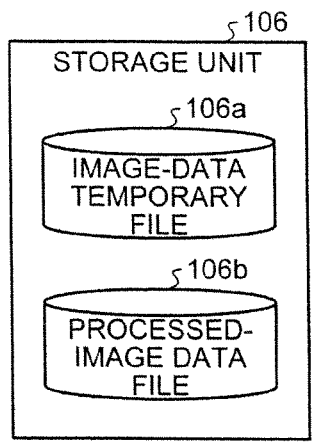
FIG. 3 is a block diagram of an example of a storage unit of the information processing apparatus.

FIG. 3 is a block diagram of an example of the storage unit 106 of the information processing apparatus 10. As shown in FIG. 3, according to the present embodiment, the storage unit 106 stores various databases, tables, files, or the like. The storage unit 106 is a storage unit and, for example, a memory device, such as a RAM or ROM, a fixed disk device, such as a hard disk, a flexible disk, or an optical disk may be used. The storage unit 106 stores computer programs for giving commands to a Central Processing Unit (CPU) to perform various types of processing.

As shown in FIG. 3, the storage unit 106 includes an image-data temporary file 106*a* and a processed-image data file 106*b*.

The image-data temporary file 106*a* temporarily stores the image data read by the scanner 50.

The processed-image data file 106*b* stores the image data obtained by processing or editing the image data read by the scanner 50.

Figure 4:
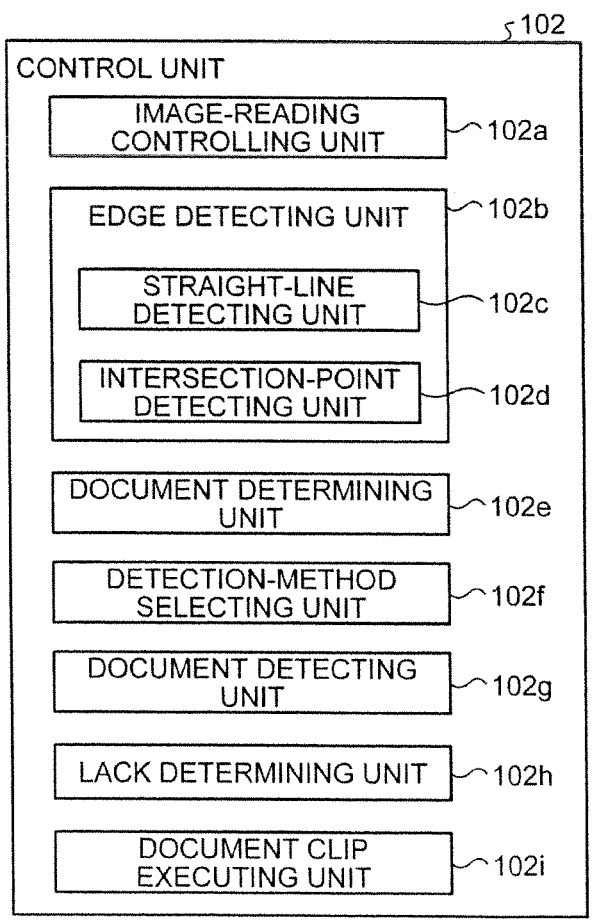
FIG. 4 is a functional block diagram of an example of a control unit of the information processing apparatus.

FIG. 4 is a functional block diagram of an example of the control unit 102 of the information processing apparatus 10. The control unit 102 includes a CPU, or the like, that performs an overall control on the information processing apparatus 10. The control unit 102 includes an internal memory that stores a control program, programs that define various processing steps, or the like, and required data, and performs information processing to execute various operations based on the programs.

As shown in FIG. 4, the control unit 102 includes, roughly, an image-reading controlling unit 102*a*, an edge detecting unit 102*b*, a document determining unit 102*e*, a detection-method selecting unit 102*f*, a document detecting unit 102*g*, a lack determining unit 102*h*, and a document clip executing unit 102*i*.

The image-reading controlling unit 102*a* controls the scanner 50 so as to acquire image data from the scanner 50. For example, according to the present embodiment, the image-reading controlling unit 102*a* controls the scanner 50 so as to start to acquire a two-dimensional image including a document by using the image sensor 56. For example, as described above, the image-reading controlling unit 102*a* drives and rotates the conveyance rollers 28*a*, 28*b* in the scanner 50, acquires, from the scanner 50 via the I/F 14, two-dimensional image data that is obtained by combining line-by-line one-dimensional image data that is subjected to a photoelectric conversion and an analog-digital conversion by the image sensor 56, and stores it in the image-data temporary file 106*a*.

The edge detecting unit 102*b* detects an edge from an image based on the image data acquired from the scanner 50. For example, the edge detecting unit 102*b* may detect the changing point of the brightness in the main scanning direction and in the sub-scanning direction of the image, thereby detecting the edge that can be the outline of the document area. The edge detecting unit 102*b* may detect an edge by using a well-known edge detection method (see, for example, JP-A-2007-88654). More specifically, to make a clear distinction between the tone of a document and the tone of a backing section, the edge detecting unit 102*b* may set a tone curve that produces a sharp change near the tone level of the backing section to further facilitate the comparison between the reference data and the image data, thereby detecting an edge of the document. As shown in FIG. 4, according to the present embodiment, the edge detecting unit 102b includes a straight-line detecting unit 102c and an intersection-point detecting unit 102d.

The straight-line detecting unit 102c detects a straight line component by using an edge component, such as a detected changing point of the brightness. The intersection-point detecting unit 102d detects the intersection point of the detected straight lines. For example, under the control of the straight-line detecting unit 102c, the edge detecting unit 102b may detect the straight line on the upper end of an image area, the straight line on the lower end, the straight line on the right end, and the straight line on the left end and, by using the intersection-point detecting unit 102d, connect the straight lines to detect the intersection point, thereby detecting a candidate for the document area.

The document determining unit 102e determines any one or both of the type of document and the shape of a document by using the image of the document read by the scanner 50. For example, the document determining unit 102e may determine the type of document and the shape of a document by using a document edge portion that is detected by the edge detecting unit 102b from the read image data. The document determining unit 102e may determine the type of document and the shape of a document by using, for example, the straight line component detected by the straight-line detecting unit 102c of the edge detecting unit 102b, or the intersection point detected by the intersection-point detecting unit 102d. The document determining unit 102e may detect the type of document and the shape of a document by using a well-known document type determination method or document shape determination method (see, for example, JP-A-2008-131254).

The detection-method selecting unit 102f selects an appropriate document detection method according to any one or both of the type of document and the shape of a document that are determined by the document determining unit 102e. More specifically, any one or both of an optimum document tilt detection method and an optimum document position detection method may be selected according to any one or both of the type of document and the shape of a document. For example, the detection-method selecting unit 102f may select, as a detection method, a document end (hereafter, sometimes referred to as the "reliable end" according to the present embodiment) that is an object of detection of any one or both of the tilt of a document and the position of a document according to the type of document and the shape of a document.

The reliable end refers to the document end that is appropriate for detection of the tilt and position of the document according to the type of document and the shape of a document and, according to the present embodiment, the reliable end is previously set corresponding to the type of document and the shape of a document. For example, according to the present embodiment, the detection-method selecting unit 102f may select, as an object of detection of the tilt of a document and the position of a document, the reliable end that is previously set corresponding to the type of document and the shape of a document that are detected by the document determining unit 102e. Depending on a type of document, a side thereof tends to become easily distorted; therefore, by using a calculation method where a heavy weight is set to a stable side (reliable end) other than the easily distorted side, it is possible to select a method for accurately detecting the tilt of a document. It is difficult to obtain a desired image by cutting a document on the inner side of the end of the document so as to hide the end of the document from the image and, at the same time, to cut a document on the outer side of the end of the document so as to prevent the lack of contents of the document. The tendency for arrangement of contents is different depending on the type of document; therefore, in this aspect, the detection-method selecting unit 102f may select the reliable end corresponding to the type of document. Moreover, an operation of the lack determining unit 102h, which will be explained later, may be performed to further prevent the occurrence of lack of a document.

Specific examples of the reliable end according to the type of document and the shape of a document are given below. For example, if a document is a receipt or is elongated, the detection-method selecting unit 102f may select, as a document tilt detection method, a method where priority is given to the long side to detect the tilt of a document. In other words, if the document determined by the document determining unit 102e is a receipt or is elongated, the detection-method selecting unit 102f may select the long side as the reliable end.

If a document is a fixed type, the detection-method selecting unit 102f may select, as a document tilt detection method, a method where four sides are used to detect the tilt of a document. In other words, if the document determined by the document determining unit 102e is a fixed type, the detection-method selecting unit 102f may select the four sides as the reliable ends.

If a document is a stitched medium, the detection-method selecting unit 102f may select, as a document tilt detection method, a method where other than the stitched side is used to detect the tilt of a document. In other words, if the document determined by the document determining unit 102e is a stitched medium, the detection-method selecting unit 102f may select a side other than the stitched side as the reliable end.

If a document contains a straight line, the detection-method selecting unit 102f may select, as a document tilt detection method, a method where the straight line is used to detect the tilt of a document. In other words, for example, if the document determined by the document determining unit 102e is not a predetermined type of document, and if a straight line is detected from the edge of a document by the straight-line detecting unit 102c, the detection-method selecting unit 102f may select the detected straight line as the reliable end.

If a document does not contain a straight line, the detection-method selecting unit 102f may select, as a document tilt detection method, a method for detecting the tilt of the document as zero. In other words, if the document determined by the document determining unit 102e is not a predetermined type of document or does not have a predetermined shape, and if the straight-line detecting unit 102c does not detect a straight line from the edge of the document, the detection-method selecting unit 102f may not select the reliable end but determines that the tilt is zero.

If a document is a predetermined type of document, the detection-method selecting unit 102f may use a document position detection method to detect the position of the document by using a rectangle that inscribes the four intersection points. In other words, if a document is a predetermined type of document, the detection-method selecting unit 102f may select, as the reliable end, a rectangle that inscribes the four intersection points detected by the intersection-point detecting unit 102d.

The document detecting unit 102g uses the detection method selected by the detection-method selecting unit 102f to detect any one or both of the tilt of a document and the position of a document. In other words, the document detecting unit 102g uses the reliable end selected by the detection-method selecting unit 102f as a reference to detect the document area.

When a document area is clipped according to any one or both of the tilt of a document and the position of a document that are detected by the document detecting unit 102g, the lack determining unit 102h determines whether the occurring lack of the document exceeds a predetermined acceptable level. More specifically, when clipping the area where a rectangle that inscribes the edge of a document is generated during detection of the document detecting unit 102g, the lack determining unit 102h calculates the degree of lack and determines whether it exceeds the threshold.

The document clip executing unit 102i clips an image of a document according to any one or both of the tilt of the document and the position of the document that are detected by the document detecting unit 102g. If the document determined by the document determining unit 102e is not a predetermined type of document, the document clip executing unit 102i may clip it on the outer side of the edge of a document. The document clip executing unit 102i stores the image data on the clipped image in the processed-image data file 106b.

If the lack determining unit 102h determines that a predetermined acceptable level is exceeded, the document clip executing unit 102i may perform clipping on the outer side of the edge of a document. If the lack determining unit 102h determines that a predetermined acceptable level is not exceeded, the document clip executing unit 102i may perform clipping on the inner side of a rectangle. Thus, if the degree of lack is low, clipping is performed on the inner side of the end of a document so that a desired image can be obtained and, if the degree of lack is high, clipping is performed on the outer side of the end of a document so that the lack of contents can be prevented.

These are the explanations of the configuration of the image-reading apparatus.

2. Operation According to the Present Embodiment

Figure 5:
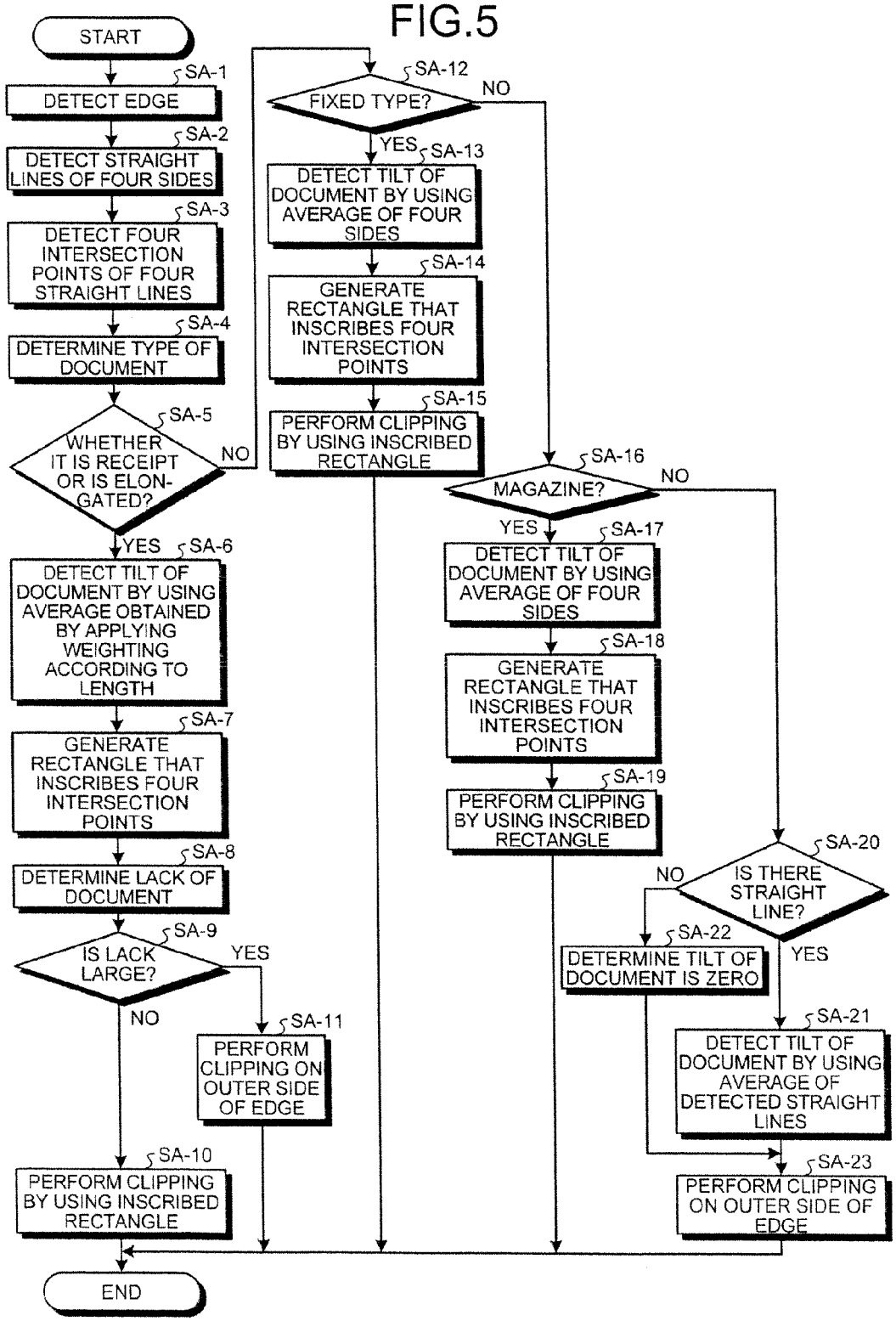
FIG. 5 is a flowchart of an example of an operation of the information processing apparatus according to the present embodiment.

Next, an example of an operation of the information processing apparatus 10 configured as above according to the present embodiment is explained below in detail with reference to FIGS. 5 to 14. FIG. 5 is a flowchart of an example of an operation of the information processing apparatus 10 according to the present embodiment. The following operation is explained based on the assumption that a document is previously read via the scanner 50 and the image data is stored in the image-data temporary file 106a of the information processing apparatus 10.

Figure 6:
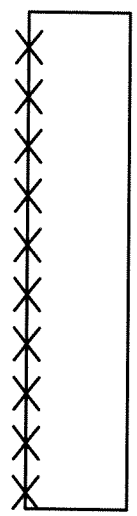
FIG. 6 is a schematic view of a method for detecting the edge of a document.

As shown in FIG. 5, the edge detecting unit 102b detects an edge from the image based on the image data that is acquired from the scanner 50 and that is stored in the image-data temporary file 106a (Step SA-1). For example, the edge detecting unit 102b may detect the changing point of the brightness in the main scanning direction and in the sub-scanning direction of the image to detect the edge that can be the outline of the document area. FIG. 6 is a schematic view of the method for detecting the edge of a document. As shown in FIG. 6, for example, the edge detecting unit 102b detects the changing point of the brightness by scanning it in a horizontal direction, thereby detecting the horizontal edges that are indicated by the mark X in the drawing.

Figure 7:
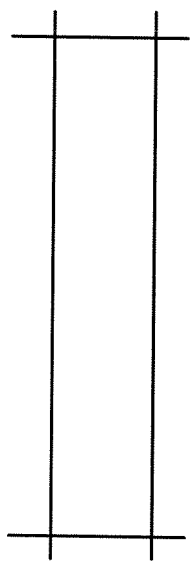
FIG. 7 is a schematic view of a method for detecting a group of four straight lines by using edge components.
Figure 8:
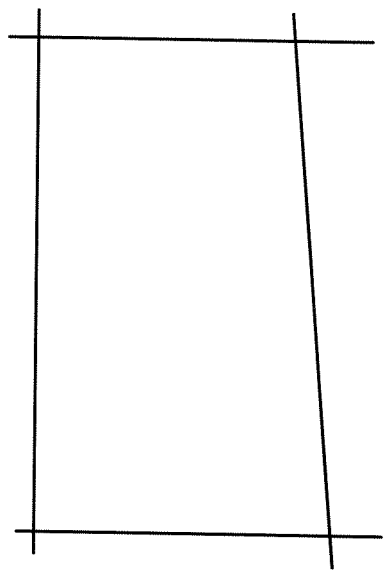
FIG. 8 is a diagram of an example of detection of a group of straight lines from the image of a medium that is stitched and cut out.

By an operation of the straight-line detecting unit 102c, the edge detecting unit 102b uses an edge component, such as a detected changing point of the brightness, to detect a group of straight lines that can be the four sides of a document (Step SA-2). FIG. 7 is a schematic view of the method for detecting a group of four straight lines by using edge components. As shown in FIG. 7, the straight-line detecting unit 102c may detect a straight line that can be obtained by connecting a group of edge points to detect a group of four straight lines. It is not assumed that a group of straight lines do not always intersect each other at a right angle. FIG. 8 is a diagram of an example of detection of a group of straight lines from the image of a medium that is stitched and cut out.

Figure 9:
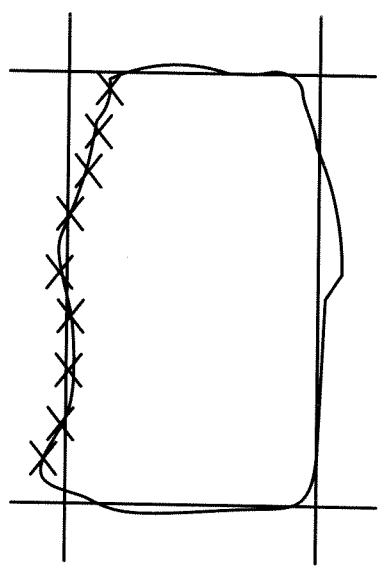
FIG. 9 is a schematic view of an example where it is difficult for a straight-line detecting unit to detect a straight line.

As shown in FIG. 8, the straight-line detecting unit 102c detects a group of straight lines by connecting the horizontal edges and the vertical edges; therefore, it can detect that the cut side is tilted. FIG. 9 is a schematic view of an example where it is difficult for the straight-line detecting unit 102c to detect a straight line. As shown in FIG. 9, the straight-line detecting unit 102c may determine that it is difficult to detect a straight line if a deviation from a straight line that approximates a group of edge points exceeds an acceptable range.

By an operation of the intersection-point detecting unit 102d, the edge detecting unit 102b detects the intersection point of the group of detected straight lines (SA-3). For example, the intersection-point detecting unit 102d may detect the four intersection points by connecting the group of four straight lines that are detected by the straight-line detecting unit 102c.

The document determining unit 102e determines any one or both of the type of document and the shape of a document (hereafter, sometimes referred to as the "type of document, or the like") by using the image of the document read by the scanner 50 (SA-4). Examples (1) to (3) of the method for determining the type of document in an operation according to the present embodiment are explained below.

(1) The Method for Determining the Type of Document by Calculating the Size of the Document According to the Number of Edges of the Document, or the Like For example, the document determining unit 102e may detect the type of document, the size of a document, or the like, according to the number of detected horizontal edges that are detected by the edge detecting unit 102b in a vertical direction at a certain interval and that are shown in FIG. 6. In this case, for example, the document determining unit 102e may determine the type of document as described below.
1) Receipt: a width of equal to or less than 82.5 mm & a length of equal to or more than 105.0 mm
2) Elongated: a length of equal to or more than 356.0 mm
3) Others: other than the above cases (2) The Method for Determining the Type of Document by Determining the Linearity of Four Sides by Using the Edge of a Document, Calculating the Four Intersection Points Thereof, and Calculating the Size of the Document For example, the document determining unit 102e may determine the accurate size of a document by using the coordinates of the straight-line intersection point that is detected by the intersection-point detecting unit 102d and that is shown in FIG. 7. For example, the document determining unit 102e may determine the type of document as described below.
1) Receipt: a width of equal to or less than 82.5 mm & a length of equal to or more than 105.0 mm
2) Elongated: a length of equal to or more than 356.0 mm
3) Fixed type, such as A4: various sizes (210 mm×297 mm in the case of A4)
4) Others: other than the above cases (3) The Method for Determining the Type of Document by Determining the Linearity of Four Sides by Using the Edge of the Document, Calculating the Four Intersection Points Thereof, and Calculating the Size and Shape of the Document For example, the document determining unit 102e may detect the size of a document by using the coordinates of the intersection point of the straight lines that are detected by the edge detecting unit 102b and that are shown in FIG. 8 and detect the shape by using the angle with which the four straight lines intersect with one another. According to a method for determining the shape, the document determining unit 102e may calculate the shape of a document by using the positional relationships among the four intersection points. The document determining unit 102e may determine the linearity by using the relationship between the edge and the four straight lines and, for example, if the straight lines in the group do not intersects with each other in substantially a vertical direction, it determines that the document is not a rectangular. If the straight-line detecting unit 102c does not detect a straight line as shown in FIG. 9, the document determining unit 102e may determine that it does not have a rectangular shape. For example, the document determining unit 102e may determine the type of document as described below.
1) Receipt: a width of equal to or less than 82.5 mm & a length of equal to or more than 105.0 mm
2) Elongated: a length of equal to or more than 356.0 mm
3) Fixed type, such as A4: various sizes (210 mm×297 mm in the case of A4)
4) Magazines, novels: if there is a linearity other than the above cases
5) Not-rectangular document: other than the above cases These are the examples (1) to (3) of the method for determining the type of document, or the like, in an operation according to the present embodiment. The document determining unit 102e may detect the type of document, or the like, by using a well-known method for determining the type of document, or the like (see, for example, JP-A-2008-131254).

Returning to FIG. 5 again, when the document determining unit 102e determines that it is a receipt or it is elongated (SA-5, Yes), the information processing apparatus 10 performs operations at the following SA-6 to SA-11.

2-1. Operations in the Case of a Receipt or being Elongated

If a document is a receipt or is elongated, the detection-method selecting unit 102f selects the detection method described below and controls the document detecting unit 102g so as to detect the tilt of a document and the position of a document by using the selected detection method.

More specifically, first, to give priority to a long side and set it as an object of detection of the tilt of a document, the document detecting unit 102g detects the tilt of the document by using the average angle that is obtained by applying weighting according to the length of a side (SA-6).

Figure 10:
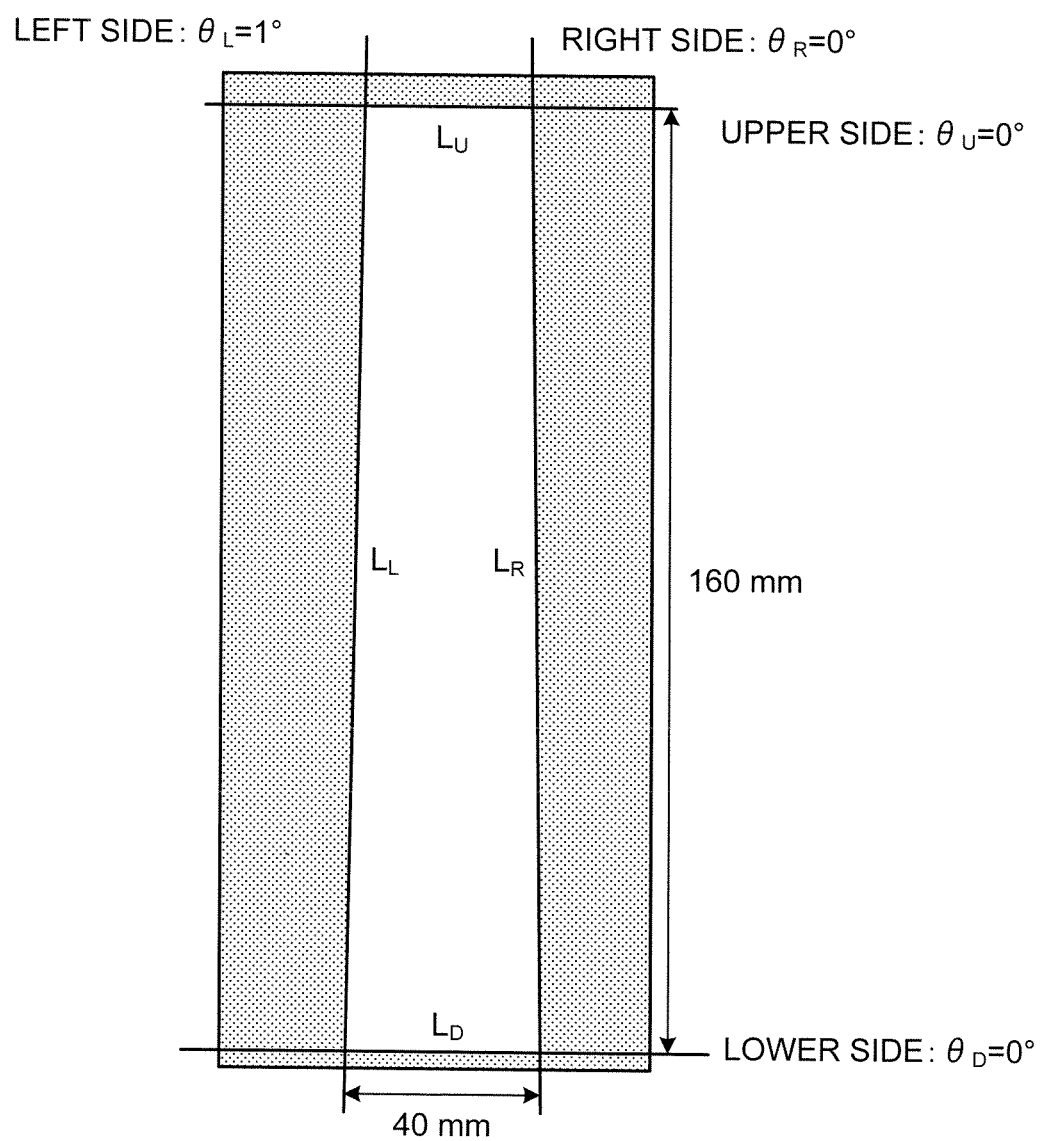
FIG. 10 is a diagram of, with regard to a group of detected straight lines, the reference mark θ that indicates the tilt of a straight line and examples of the numbers.

If a document is a receipt, it has characteristics such that a distortion easily occurs on a short side thereof because it is cut on the short side or such that it is not linear because a sheet is torn by hand. Therefore, the detection-method selecting unit 102f determines the average angle by applying weighting to the tilts of the four sides according to the length of the side; thus, it detects the tilt of the document while attaching importance to the tilt of the long side that is more stable than the short side. FIG. 10 is a diagram of, with regard to a group of detected straight lines, the reference mark θ that indicates the tilt of a straight line and examples of the numbers.

$L_U$ is the length of the upper side, $\theta_U$ is the tilt of the upper side, $L_D$ is the length of the lower side, $\theta_D$ is the tilt of the lower side, $L_L$ is the length of the left side, $\theta_L$ is the tilt of the left side, $L_R$ is the length of the right side, and $\theta_R$ is the tilt of the right side.

For example, the document detecting unit 102g may use the following equation to determine the average tilt by applying weighting to the tilts of the four sides according to the length thereof.

$$Rect\theta = (\theta_U \times L_U + \theta_D \times L_D + \theta_L \times L_L + \theta_R \times L_R)/(L_U + L_D + L_L + L_R)$$

If a document is elongated, it has a characteristic such that the upper and lower short sides are not parallel to each other because the document is very long and is deformed. Therefore, in the same manner as in the case of a receipt, the document detecting unit 102g may determine the average angle by applying weighting to the tilts of the four sides according to the length of the side; thus, it detects the tilt of a document while attaching importance to the tilt of the long side that is more stable than the short side.

Figure 11:
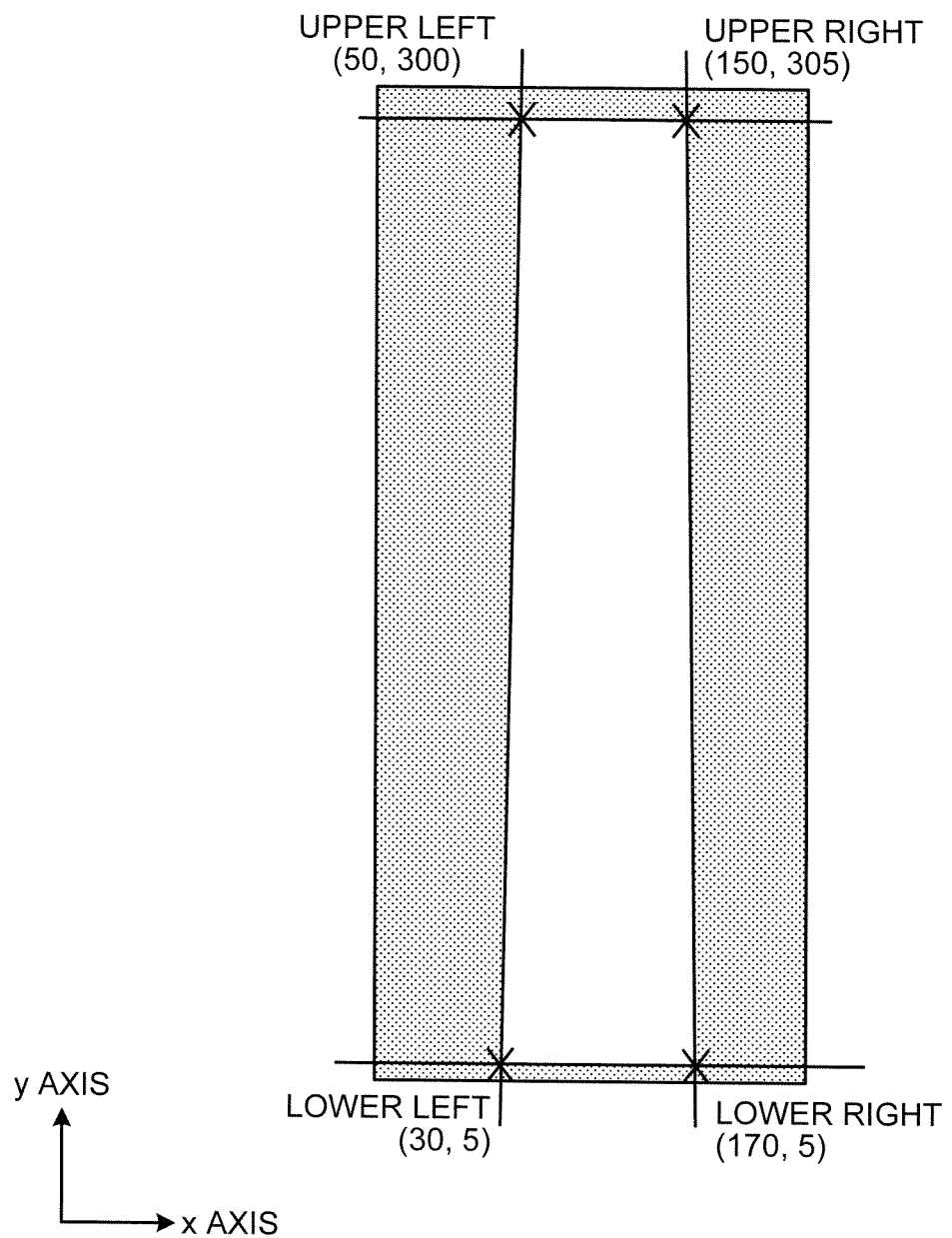
FIG. 11 is a diagram of the coordinates of the four intersection points of the straight lines in a group.

Returning to FIG. 5 again, the document detecting unit 102g generates a rectangle that inscribes the four edge intersection points with the tilt angle of the document detected at SA-6 (SA-7). FIG. 11 is a diagram of the coordinates of the four intersection points of the straight lines in a group, and FIG. 12 is a diagram of a rectangle that inscribes the four intersection points of the straight lines in the group of FIG. 11 and that is indicated by a broken line.

Figure 12:
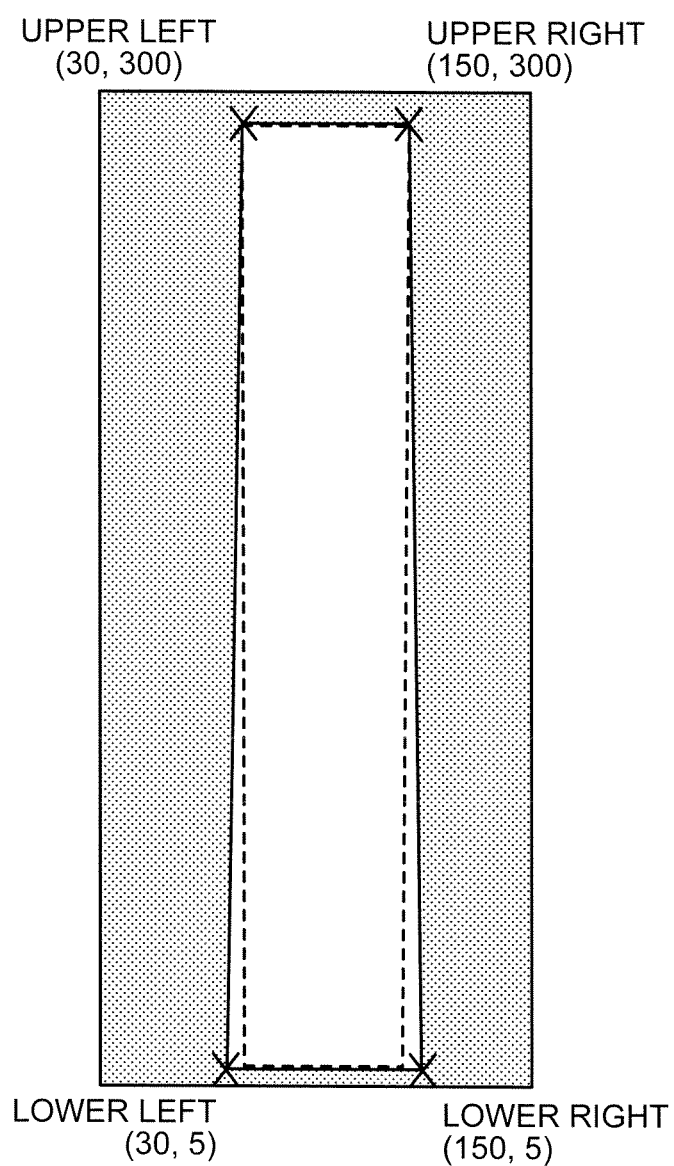
FIG. 12 is a diagram of a rectangle that inscribes the four intersection points of the straight lines in the group of FIG. 11 and that is indicated by a broken line.

As shown in FIG. 12, even if a quadrilateral that is made up of a group of straight lines is not rectangular, the document detecting unit 102g generates a rectangle on the inner side and generates a clipped area that does not include the end of the document. More specifically, according to a method for generating a rectangle that inscribes the edge intersection points, the edge intersection points of the upper side of FIG. 11 are aligned to, out of the upper left and upper right points, the one that has a smaller y-coordinate value, and the same operation is performed on the four sides, whereby a rectangle can be generated on the inner side of the edge intersection points (see the coordinates in FIG. 12). A rectangle on the inner side of the four edge intersection points is an object to be clipped; therefore, it is expected that a desired image with the end of the document removed can be acquired. However, the document of a receipt has a small margin and, because an elongated document is long, a minor error during detection of the tilt of a document results in a major error for two ends of the long side. Therefore, in any types of document, the lack of contents easily occurs when the end of the document is cut. For this reason, the following operation is performed.

Specifically, when clipping is performed by using the inscribed rectangle detected by the document detecting unit 102g, the lack determining unit 102h determines whether the degree of lack of contents exceeds a threshold (SA-8).

If the degree of lack of contents does not exceed the threshold (SA-9, No), the document clip executing unit 102i clips an image of the document by using the inscribed rectangle detected by the document detecting unit 102g at SA-7 (SA-10).

Figure 14:
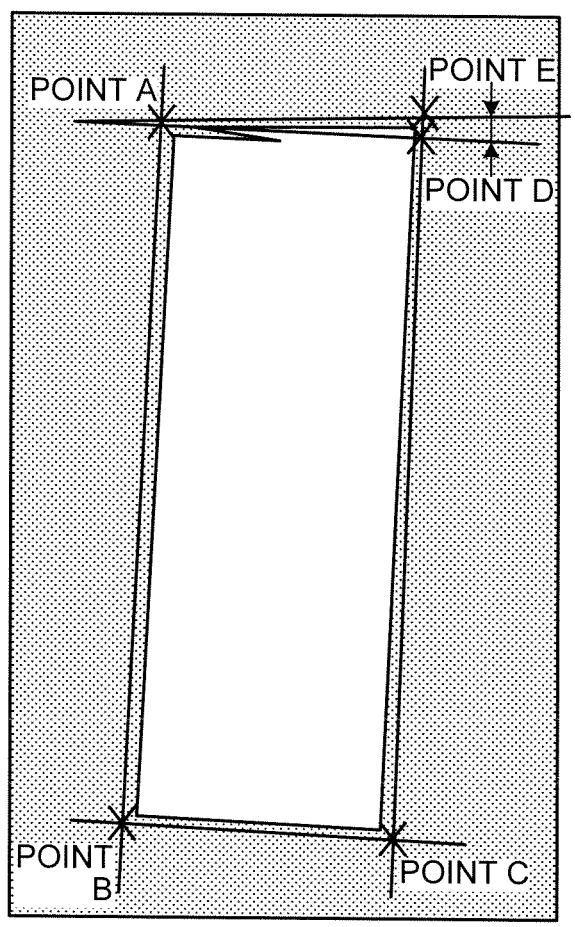
FIG. 14 is a diagram of an example of the relationships among the coordinate points in a group when the lack of contents is large.

Conversely, if the degree of lack of contents exceeds the threshold (SA-9, Yes), the document clip executing unit 102i performs clipping on the outer side of the edge instead of the inscribed rectangle detected by the document detecting unit 102g at SA-7 (SA-11). FIG. 14 is a diagram of an example of the relationships among the coordinate points in a group when the lack of contents is large.

As shown in FIG. 14, the lack determining unit 102h may compare the edge intersection points detected from the image with the positions of the four points on the corners of the inscribed rectangle and, with respect to the side for which the difference therebetween is largest, determine whether the difference exceeds a threshold (e.g., 5 mm). If the lack is larger than the threshold, the lack of contents may occur; therefore, the end of the document is not cut by using the inscribed rectangle, and a circumscribed rectangle is regenerated so that clipping is performed. The threshold may be changed according to the type of document. For example, a threshold for lack determination may be set to a lower value, e.g., 2 mm, for a receipt because the contents are often located near the end of the document thereof, and it may be set to 5 mm, or the like, for others.

Figure 13:
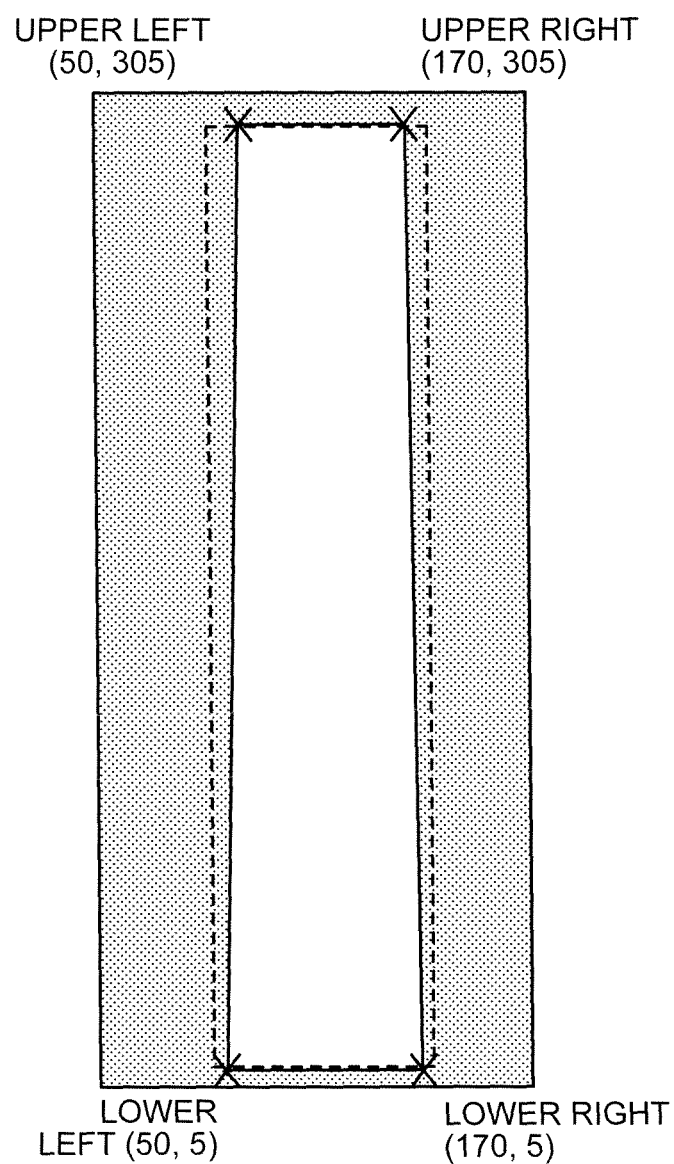
FIG. 13 is a diagram of, as an example of outer-side clipping, a rectangle that circumscribes the four intersection points of the straight lines in the group of FIG. 11 and that is indicated by a broken line.

According to an example of the method for calculating the degree of lack, the edge intersection points detected from an image are compared with the positions of the four points on the corners of the inscribed rectangle. It is assumed that the points A, B, C, and E of FIG. 14 are the edge intersection points and ABCD is a corresponding inscribed rectangle. Here, the point is moved most largely from E→D, and the distance is calculated to determine the degree of lack. If the distance exceeds a threshold, clipping is performed by using a circumscribed rectangle instead of an inscribed rectangle. FIG. 13 is a diagram of, as an example of outer-side clipping, a rectangle that circumscribes the four intersection points of the straight lines in the group of FIG. 11 and that is indicated by a broken line.

As shown in FIG. 13, if the lack of contents is large, priority is given to prevention of the lack of contents over generation of a desired image with the end of the document removed; therefore, the document clip executing unit 102i performs clipping by using a circumscribed rectangle. More specifically, according to a method for generating a rectangle that circumscribes the edge intersection points, the edge intersection points of the upper side of FIG. 11 are aligned to, out of the upper left and upper right points, the one that has a larger y-coordinate value, and the same operation is performed on the four sides, whereby a rectangle can be generated on the outer side of the edge intersection points (see the coordinates in FIG. 13).

These are an example of an operation performed when it is determined that the type of document is a receipt or is elongated.

Returning to FIG. 5 again, if the document determining unit 102e does not determine that it is a receipt or is elongated (SA-5, No) but determines that it is a fixed type (SA-12, Yes), the information processing apparatus 10 performs operations at the following SA-13 to SA-15.

2-2. Operation in the Case of a Fixed Type

If an document is a fixed type, the detection-method selecting unit 102f selects the detection method described below and controls the document detecting unit 102g so as to detect the tilt of the document or the position of the document by using the selected detection method.

More specifically, first, the document detecting unit 102g determines the average tilt angle of the four sides and detects the tilt of the document with fluctuations reduced (SA-13). There are basically no distortions in the case of a fixed type; however, according to the present embodiment, the tilt of a document is determined by using the average of the four sides in consideration of a circumstance where the four sides fluctuate even slightly.

To obtain a desired image by cutting the end of a document, the document detecting unit 102g generates a document area by using a rectangle that inscribes the edge intersection points with the tilt angle of the document (SA-14).

The document clip executing unit 102i then clips the detected document area (SA-15). Because there are basically no distortions in the case of a fixed type, lack determination is not performed.

These are an example of an operation performed when it is determined that the type of document is a fixed type.

If the document determining unit 102e does not determine that it is a fixed type (SA-12, No) but determines that it is a magazine (including a novel) (SA-16, Yes), the information processing apparatus 10 performs operation at the following SA-17 to SA-19.

2-3. Operation in the Case of Magazines

If a document is a magazine, the detection-method selecting unit 102f selects the detection method described below and controls the document detecting unit 102g so as to detect the tilt of the document or the position of the document by using the selected detection method.

More specifically, first, the document detecting unit 102g determines the average tilt angle of the four sides and detects the tilt of the document with the tilt of the long side reduced (SA-17). This is because, in the case of magazines, it is cut on the long side, which is a stitched section, and the tilt easily occurs only on the cut long side. To further improve the accuracy, if the tilt of the long side is detected, a calculation may be performed by using the three sides other than the long side.

To obtain a desired image by cutting the end of a document, the document detecting unit 102g generates a document area by using a rectangle that inscribes the edge intersection points with the tilt angle of the document (SA-18).

The document clip executing unit 102i then clips the detected document area (SA-19). The document of a magazine contains a lot of margins and the lack of contents is unlikely to occur; therefore, lack determination is not performed.

These are an example of the operation performed when it is determined that the type of document is a magazine.

If the document determining unit 102e does not determine that it is a magazine (SA-16, No), the information processing apparatus 10 performs operations at the following SA-20 to SA-23.

2-4. Operation in Other Cases

If a document is other than a predetermined type of document (for example, if a document is largely distorted, or if a document has a shape that significantly diverges from a rectangle), the detection-method selecting unit 102f selects the detection method described below and controls the document detecting unit 102g so as to detect the tilt of a document or the position of a document by using the selected detection method.

First, the detection-method selecting unit 102f determines whether there is a straight line detected by the straight-line detecting unit 102c and controls the document detecting unit 102g so as to select the detection method as described below depending on whether there is a straight line (SA-20).

Specifically, if there is no straight line (SA-20, No), the document detecting unit 102g detects the tilt of a document as zero (SA-22).

Conversely, if there are straight lines (SA-20, Yes), the document detecting unit 102g detects the tilt of a document by using the average of the detected straight lines (SA-21). The average tilt angle of the detected sides is detected as the tilt of the document.

The document clip executing unit 102*i* then performs clipping by using a rectangle that circumscribes the edge of the document with the detected tilt angle of the document (SA-23). Sometimes it is difficult to calculate the edge intersection point; therefore, if a document is not rectangular, the entire document is clipped, and lack determination is not performed.

These are an example of the operation performed by the information processing apparatus 10 of the present embodiment.

3. Summary of the Present Embodiment and Other Embodiments

As above, according to the present embodiment, any one or both of the type of read document and the shape of the document is determined, any one or both of an appropriate method for detecting the tilt of the document and an appropriate method for detecting the position of the document is selected according to any one or both of the determined type of document and the determined shape of the document, and any one or both of the tilt of the document and the position of the document are detected by using the selected detection method. Thus, the document area can be accurately detected with regard to various types of document and shapes of a document.

According to the present embodiment, the end of a document that is an object of detection of any one or both of the tilt of the document and the position of the document is selected as a detection method according to any one or both of the type of document and the shape of the document; therefore, the tilt of a document and the position of a document can be accurately determined by using the reliable end of the document according to the type of document, or the like.

According to the present embodiment, in a method for detecting the tilt of a document, if a document is a receipt or is elongated, priority is given to the long side thereof and the tilt of the document is detected; therefore, even if it is a receipt or is elongated where the short side thereof is easily distorted, the document area can be accurately determined.

According to the present embodiment, in a method for detecting the tilt of a document, if a document is a fixed type, the tilt of the document is detected by using the four sides thereof; therefore, even if some distortions occur in the case of a fixed type, the document area can be accurately determined.

According to the present embodiment, in a method for detecting the tilt of a document, if a document is a stitched medium, the tilt of the document is detected by using other than the stitched side thereof; therefore, even if the stitched side is cut at a tilt, the document area can be accurately determined.

According to the present embodiment, in a method for detecting the tilt of a document, if a document contains a straight line, the tilt of the document is detected by using the straight line; therefore, even if a document is not a predetermined type of document, the document area can be accurately determined by using the linearity.

According to the present embodiment, in a method for detecting the tilt of a document, if a document does not contain a straight line, the tilt of the document is detected as zero; therefore, even if a document does not have a rectangular shape, the lack of the document can be reduced.

According to the present embodiment, in a method for detecting the position of a document, if a document is a predetermined type of document, the position of the document is detected by using a rectangle that inscribes the four intersection points; therefore, a desired image with the end of the document removed can be obtained.

According to the present embodiment, the image of a document is clipped according to any one or both of the detected tilt of the document and the detected position of the document; therefore, the image of the accurately detected document area can be acquired.

According to the present embodiment, if a document is not a predetermined type of document, it is clipped on the outer side of the edge of the document; therefore, even if it is not rectangular, the lack of a document can be reduced.

According to the present embodiment, when clipping is performed by using a detected rectangle, it is determined whether the occurring lack of a document exceeds a predetermined acceptable level; therefore, lack of a document can be prevented.

According to the present embodiment, if it is determined that the predetermined acceptable level is exceeded, clipping is performed on the outer side of the edge of the document; therefore, if it is expected that lack of a document is large, clipping is performed on a larger scale so that the contents are not lost.

According to the present embodiment, if it is determined that the predetermined acceptable level is not exceeded, clipping is performed on the inner side of the above-described rectangle; therefore, if lack of a document is small, a desired image with the end of the document removed can be obtained.

Other than the above-described embodiment, the present invention may be implemented according to various different embodiments within the range of the technical idea that is set forth in the scope of claims. For example, the image sensor 56 may detect light of various wavelength ranges. Although, in the explanation, for example, the information processing apparatus 10 performs an operation in a stand-alone mode, the information processing apparatus 10 may perform an operation in response to a command from a client terminal that is a separate chassis and return the result of the operation to the client terminal. Among the operations described in the embodiment, all or some of the operations that are automatically performed as described may be performed manually, or all or some of the operations that are manually performed as described may be performed automatically by using a well-known method. The operation procedures explained in the above-described document and the drawings, the control procedures, the specific names, information including registered data during each operation, examples of screens, and database structures may be arbitrarily changed except as otherwise noted.

Each of the illustrated components of the information processing apparatus 10 is functionally conceptual and does not necessarily need to be physically configured as illustrated in the drawings. For example, all or any part of the processing functions provided by each unit of the information processing apparatus 10, especially, the processing functions provided by the control unit 102 may be implemented by a Central Processing Unit (CPU) and a program that is interpreted and executed by the CPU, or it may be implemented by a wired logic as hardware. The program is stored in a recording medium described below, and it is automatically read by the information processing apparatus 10 as needed. Specifically, the storage unit 106, such as a ROM or an HDD, stores a computer program for performing various operations. The computer program is executed by being loaded into the RAM, and it operates in conjunction with the CPU to constitute the control unit. The computer program may be stored in an application program server that is connected to the information processing apparatus 10 via an arbitrary network, and all or some of them may be downloaded as needed.

The program according to the present invention may be stored in a recording medium readable by a computer, and it may be configured as a program product. Here, the "recording medium" includes any "portable physical media", such as a memory card, USB memory, SD card, flexible disk, magneto-optical disk, ROM, EPROM, EEPROM, CD-ROM, MO, DVD, or Blu-ray (registered trademark) Disc. The "program" is a data processing method that is described in an arbitrary language or description method, and the format of a source code, binary code, or the like, is not specified. The "program" is not always limited to the one that is uniformly configured, but it includes the one that is configured to be distributed as multiple modules or libraries or includes the one that operates in conjunction with a separate program, typically an Operating System (OS), to perform a function. Well-known configurations and procedures may be used by each device described in the embodiment as a specific configuration for reading a recording medium, a reading procedure, installing procedure after reading, or the like.

Various databases (the image-data temporary file 106a and the processed-image data file 106b), or the like, stored in the storage unit 106 are a memory device, such as a RAM or a ROM, a fixed disk device, such as a hard disk, a flexible disk, and a storage unit, such as an optical disk, and they store various programs, tables, databases, or the like, that are used for various types of processing.

The information processing apparatus 10 may be configured as a known information processing apparatus, such as a personal computer, workstation, or the like, and the information processing apparatus may be configured to be connected to any peripheral devices. The information processing apparatus 10 may be implemented by installing software (including programs, data, or the like) in the information processing apparatus to perform the method according to the present invention. Specific forms of separation and combination of devices are not limited to those depicted in the drawings, and all or some of them may be configured to be functionally or physically separated or combined in an arbitrary unit depending on various types of loads or function loads. That is, the above-described embodiments may be implemented by being arbitrarily combined, and the embodiments may be selectively implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-reading apparatus that reads an image of a document comprising a Central Processing Unit (CPU) programmed to:
determine any one or both of a type of document and a shape of a document;
select any one or both of an appropriate document tilt detection method and an appropriate document position detection method according to any one or both of the determined type of document and the determined shape of the document;
detect any one or both of a tilt of the document and a position of the document by using the selected detection method; and
when clipping is performed by using a detected rectangle, determine whether an occurring lack of a document exceeds a predetermined acceptable level.

2. The image-reading apparatus according to claim 1, wherein, when a document is a receipt or is elongated, the CPU selects, as a method for detecting the tilt of the document, detection of the tilt of the document while giving priority to a long side.

3. The image-reading apparatus according to claim 1, wherein, when a document is a fixed type, the CPU selects, as a method for detecting the tilt of the document, detection of the tilt of the document by using four sides.

4. The image-reading apparatus according to claim 1, wherein, when a document is a medium cut out, the CPU selects, as a method for detecting the tilt of the document, detection of the tilt of the document by using other than a cut out side.

5. The image-reading apparatus according to claim 1, wherein, when a document contains a straight line, the CPU selects, as a method for detecting the tilt of the document, detection of the tilt of the document by using the straight line.

6. The image-reading apparatus according to claim 1, wherein, when a document does not contain a straight line, the CPU selects, as a method for detecting the tilt of the document, detection of the tilt of the document as zero.

7. The image-reading apparatus according to claim 1, wherein, when a document is a predetermined type of document, the CPU selects, as a method for detecting the position of the document, detection of the position of the document by using a rectangle that inscribes four intersection points.

8. The image-reading apparatus according to claim 1, wherein the CPU is further programmed to clip an image of a document according to any one or both of the tilt of the document and the position of the document that are detected by a document detector.

9. The image-reading apparatus according to claim 8, wherein, when a document is not a predetermined type of document, the CPU performs clipping on an outer side of an edge of the document.

10. The image-reading apparatus according to claim 1, wherein, when the CPU determines that the predetermined acceptable level is exceeded, the CPU performs clipping on an outer side of an edge of a document.

11. The image-reading apparatus according to claim 1, wherein, when the lack determiner determines that the predetermined acceptable level is not exceeded, a document clip performer performs clipping on an inner side of the rectangle.

12. An image-reading method executed by a computer comprising:
a document determining step of determining any one or both of a type of document and a shape of a document;
a detection-method selecting step of selecting any one or both of an appropriate document tilt detection method and an appropriate document position detection method according to any one or both of the determined type of document and the determined shape of the document;

a document detecting step of detecting any one or both of a tilt of the document and a position of the document by using the selected detection method; and a determining step of determining whether an occurring lack of a document exceeds a predetermined acceptable level, when clipping is performed by using a detected rectangle.

13. A non-transitory computer readable medium including programmed instructions, the instructions, when executed by a computer, causing the computer to execute:

a document determining step of determining any one or both of a type of document and a shape of a document;

a detection-method selecting step of selecting any one or both of an appropriate document tilt detection method and an appropriate document position detection method according to any one or both of the determined type of document and the determined shape of the document;

a document detecting step of detecting any one or both of a tilt of the document and a position of the document by using the selected detection method; and a determining step of determining whether an occurring lack of a document exceeds a predetermined acceptable level, when clipping is performed by using a detected rectangle.

\* \* \* \* \*